(12) United States Patent
Arndt

(10) Patent No.: US 7,058,486 B2
(45) Date of Patent: Jun. 6, 2006

(54) METHOD AND DEVICE FOR DETERMINING THE FLOAT ANGLE OF A MOTOR VEHICLE

(75) Inventor: Dietmar Arndt, Hatvan (HU)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 10/681,022

(22) Filed: Oct. 8, 2003

(65) Prior Publication Data

US 2004/0128036 A1 Jul. 1, 2004

(30) Foreign Application Priority Data

Oct. 15, 2002 (DE) ................. 102 47 991

(51) Int. Cl.
*G05D 1/00* (2006.01)

(52) U.S. Cl. ............... 701/1; 701/36; 701/213
(58) Field of Classification Search .................. 701/1, 701/36, 48, 69, 70, 82, 83, 93, 94, 213
See application file for complete search history.

(56) References Cited

U.S. PATENT DOCUMENTS

| | | | | |
|---|---|---|---|---|
| 6,658,343 | B1 * | 12/2003 | Koch et al. | 701/71 |
| 6,671,605 | B1 * | 12/2003 | Ehret et al. | 701/70 |
| 6,757,605 | B1 * | 6/2004 | Hartmann | 701/70 |
| 6,873,897 | B1 * | 3/2005 | Faye et al. | 701/70 |

FOREIGN PATENT DOCUMENTS

| | | |
|---|---|---|
| DE | 197 48 127 | 5/1999 |
| DE | 100 50 173 | 4/2001 |
| DE | 199 45 119 | 4/2001 |
| DE | 100 08 550 | 9/2001 |

* cited by examiner

*Primary Examiner*—Richard M. Camby
(74) *Attorney, Agent, or Firm*—Kenyon & Kenyon LLP

(57) ABSTRACT

A method for determining the float angle of a motor vehicle is described, a yaw sensor determining the yaw rate of the motor vehicle. According to this method, the direction of the velocity in the center of gravity of the vehicle in particular is determined by a frequency analysis of the signals received by a GPS receiver located in the motor vehicle, and the float angle is determined as a function of at least the yaw rate and the direction of the velocity of the motor vehicle.

9 Claims, 2 Drawing Sheets

METHOD AND DEVICE FOR DETERMINING THE FLOAT ANGLE OF A MOTOR VEHICLE

FIELD OF THE INVENTION

The present invention relates to a method and a device for determining the float angle of a motor vehicle.

BACKGROUND INFORMATION

A method and a device for determining a motion parameter of a motor vehicle are known from German Published Patent Application No. 100 08 550, a controller being used to determine in particular the current velocity vector and the angle between the vehicle longitudinal axis and the velocity vector (float angle) via a differential navigation system (D-GPS). Since the differential navigation system (D-GPS) delivers considerably more precise positional data than a 'normal' navigation system used in motor vehicles, it is also possible to determine the velocity vector of the motor vehicle with greater precision. This may be relevant on a slick road surface in particular, when the motor vehicle starts to skid or the measurement data of the wheel sensor are no longer reliable. Another embodiment provides that the data delivered by the navigation system is also used to verify and monitor the sensor data. If a predetermined limiting value is exceeded, a corresponding error message may be output.

A method of navigating a ground-based vehicle is specified in German Published Patent Application No. 199 45 119, the path length variable being measured using the rotational speed of one wheel. In this connection, it is desirable to be able to base the navigation on more exact information. The path length variable is calibrated using at least one external position sensor.

A navigation device for motor vehicles is known from German Published Patent Application No. 197 48 127 in which dead reckoning is used in addition to other position finding methods. An acceleration sensor installed in the navigation device, the output signal of which is integrated two times, is preferably provided for the odometry for the dead reckoning. In addition, a yaw sensor may be provided for the route determination of dead reckoning.

The features of the related art are derived from German Published Patent Application No. 100 50 173.

SUMMARY OF THE INVENTION

The present invention is directed to a method of determining the float angle of a motor vehicle, a yaw sensor determining the yaw rate of the motor vehicle.

According to the present invention:
the direction of the velocity in the center of gravity of the vehicle in particular is determined by a frequency analysis of the signals received by a GPS receiver located in the motor vehicle, and
the float angle is determined as a function of at least the yaw rate and the direction of the velocity of the motor vehicle.

The advantage of this type of determination lies in its high precision since the GPS system determines the vehicle longitudinal speed and its direction at a very high precision.

An advantageous embodiment is characterized in that
an angular speed is determined from the velocity determined using the GPS receiver and
the angular speed is included in the determination of the float angle.

The determination of the angular speed provides a variable, which has the same physical dimension as the yaw rate and may thus be associated with it and compared with it in a simple manner.

An advantageous embodiment is characterized in that the angular speed describes the rotational speed of the vector that describes the velocity. The knowledge of the rotational speed of the vector describing the velocity simplifies the determination of the float angle considerably.

Another advantageous embodiment is characterized in that
the difference between the yaw rate and the angular speed is determined and
the float angle is determined from this difference using its integration over time.

This advantageously provides a method for determining the float angle, which is simple and easy to integrate in a control unit.

An advantageous embodiment is characterized in that the direction of the velocity determined via the GPS system is determined by utilizing the physical Doppler effect. This ensures a high precision of the determined velocity.

The device for determining the float angle of a motor vehicle includes
a yaw rate sensor for determining the yaw rate (wyaw) of the vehicle.

In accordance with the device:
a GPS receiver located in the motor vehicle is present to determine the direction of the velocity, in the center of gravity of the motor vehicle in particular, by analyzing the frequency of the received signals and
a detection device is present in which the float angle is determined starting at least from the yaw rate and the direction of the velocity of the motor vehicle.

DETAILED DESCRIPTION

Figure 1:
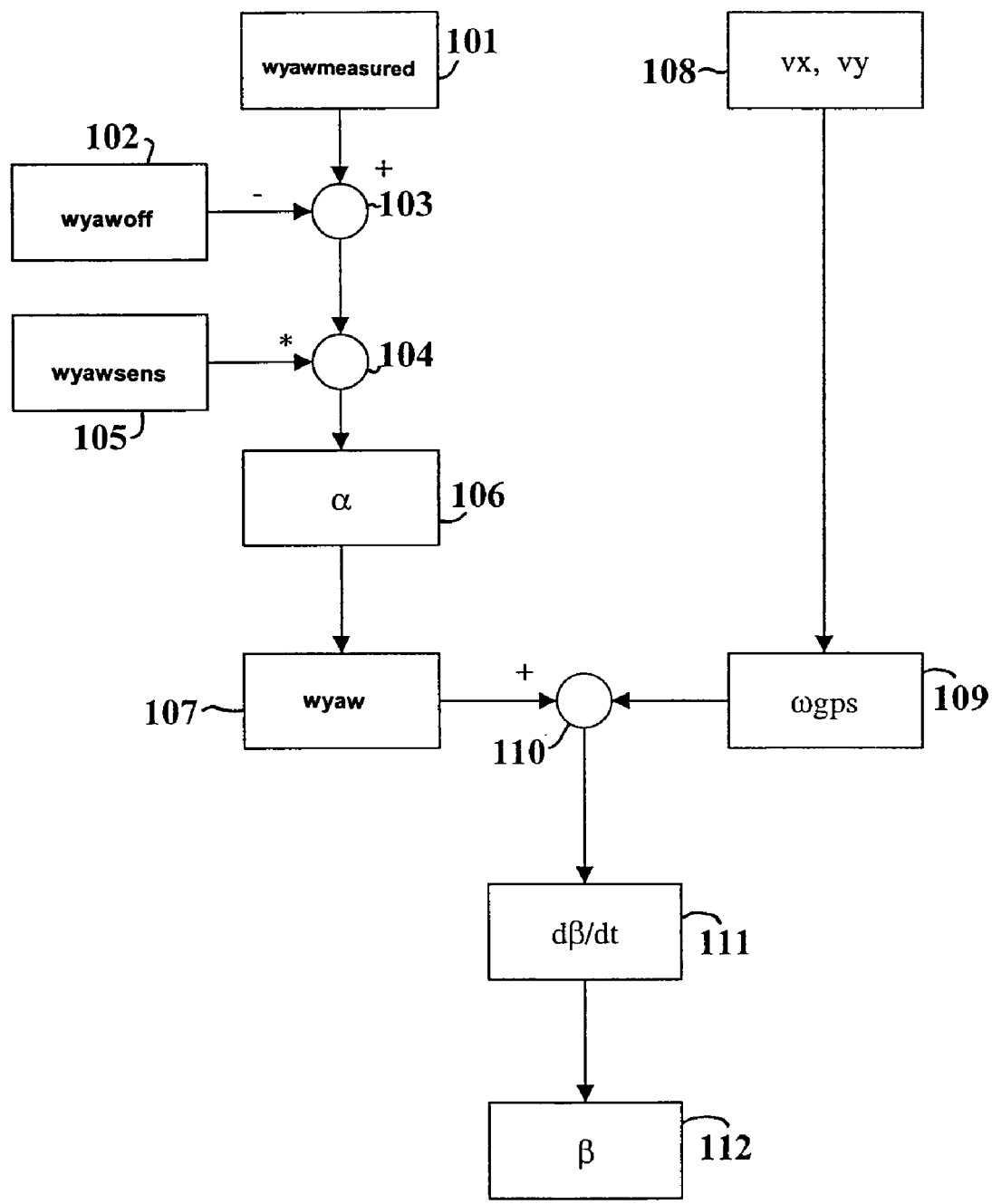
FIG. 1 shows the sequence of operations of the method for determining the float angle.

Systems that stabilize the driving state of a vehicle in extreme driving situations (i.e., critical driving situations) are becoming increasingly significant at the present time. For example, anti-lock systems (ABS) and vehicle dynamics control systems (e.g., electronic stability program (ESP)) might be mentioned here. The sensor systems that such systems use are basically
a yaw rate sensor,
a transverse acceleration sensor,
wheel speed sensors,
one or a plurality of brake pressure sensors and
a steering angle sensor.

The use of these sensors determines
the driver's intention and
the motion state of the vehicle.

The float angle of relevance for the vehicle dynamics is customarily estimated from the data supplied by these sensors. The float angle is understood to be the angle between the vehicle longitudinal axis and the direction of the velocity in the center of gravity of the vehicle.

In the present invention, the float angle is determined using a single GPS antenna attached to the vehicle and a yaw rate sensor. The value determined in this manner may of course be used to support or correct the float angle estimated from sensor data.

Via the Doppler effect (the Doppler effect is understood to be the frequency shift during relative motion between the beam source and beam receiver), it is possible to calculate the relative speed between the GPS antenna attached to the vehicle and the corresponding GPS satellite from the GPS signals. If there is direct contact with four satellites, it is possible to determine a 3D velocity vector (vx, vx, vz) at a precision on the order of magnitude of 0.1 m/s at a detection frequency of 10 Hz. This velocity vector is determined using a frequency analysis, which records and analyzes the Doppler effect occurring as a result of the vehicle motion. In contrast to this high-precision speed determination, the position finding using a GPS system (a precision on the order of magnitude of 10 m is attained) is less accurate.

The velocity vector is determined in the center of gravity of the motor vehicle (i.e., the center of gravity velocity). Using a GPS system (which is based on the reception and analysis of signals transmitted by satellite and received by an antenna), this may be achieved in two different ways.

1. The GPS receiver is located in the vertical axis of the vehicle, which passes through the vehicle center of gravity. Frequently, the vertical axis passing through the vehicle center of gravity is in the vicinity of the dashboard. For that reason, in such cases it is appropriate to install the GPS receiver in the dashboard. Another suitable installation site for the GPS antenna is the line of contact between the vehicle's windshield and body.
2. In the event that an installation close to the vehicle center of gravity is not possible, the speed components detected by the GPS receiver may be transformed into the center of gravity. This is done by applying the transformation rules vx_sp=vx+wyaw*Rx and vy_sp=vy−wyaw*Ry, where, vx_sp and vy_sp are the speed components in the vehicle center of gravity, vx and vy are the velocity components at the installation site of the GPS antenna and wyaw is the yaw rate of the motor vehicle determined, for example, using a yaw rate sensor. Rx and Ry denote the distance of the GPS receiver from the vehicle center of gravity in longitudinal and transverse directions, respectively. If correction terms wyaw*Rx and wyaw*Ry are much smaller than vx and vy, respectively, they may frequently be disregarded.

The projection of this 3D velocity vector onto the x–y plane will be observed in the following; the velocity components in z direction (vz) will be disregarded. In constant straight ahead driving, the vector changes neither its absolute value nor its direction. In non-critical cornering with a constant speed, this vector rotates with the vehicle in the x-y plane at the angular speed wgps. In the vehicle itself, a yaw rate wyawmeasured is measured in this situation using the yaw rate sensor.

In this case, the variables wgps and wyawmeasured have the following illustrative meaning:

wgps: This variable indicates the angular speed at which the velocity vector of the vehicle center of gravity rotates.
wyawmeasured: This variable indicates the yaw rate measured using the yaw rate sensor of the vehicle, i.e., the angular speed at which the vehicle longitudinal axis rotates.

On a level road surface, yaw rate wyawmeasured measured in the vehicle coincides with wgps as long as no float angle is developed. However, if the two variables deviate from each other, then the difference between the time derivative of the float angle over time, i.e., the change of float angle db divided by time interval dt corresponds to:

$$db/dt = wyaw - wgps.$$

The variable wyaw is the value of wyawmeasured corrected for precision, sensitivity, and transverse inclination of the road surface. This will be described in greater detail in the description of FIG. 1.

Through the integration over time of variables db/dt, the float angle:

$$b = I(wyaw - wgps)dt$$

is obtained.

"I" denotes the integral symbol.

The sequence of operations of one embodiment of the method of the present invention of determining the float angle is shown in FIG. 1.

Yaw rate wyawmeasured is measured in block 101 using the yaw rate sensor. This variable is supplied to gate block 103. In block 103, the difference $$wyawmeasured - wyawoff$$

is formed. wyawoff denotes the offset value of the yaw rate measured by the yaw rate sensor supplied by block 102. The output signal of block 103 is supplied to further gate block 104. In this block, a multiplication $$wyawsens*(wyawmeasured - wyawoff)$$

takes place.

wyawsens is a dimensionless variable provided by block 105 and denotes the sensitivity of the yaw rate sensor. The result of block 104 is forwarded to block 106. Lateral angle of inclination a of the road surface is provided in block 106.

The result of block 106 is forwarded to block 107.

In block 107, the measured yaw rate is corrected with respect to the lateral inclination of the road surface. This is associated with the fact that for a laterally inclined road surface, the yaw rate sensor does not determine the yaw rate physically present, but instead a value that is too small.

The correction in block 107 is:

$$wyaw = wyawsens*(wyawmeasured - wyawoff)/\cos(a).$$

At this point, it should be stressed that the function of blocks 102, 103, 104, and 105 is only to correct measured yaw rate wyawmeasured with respect to offset and sensitivity.

In block 108, velocity components vx and vy are determined via the GPS system. This is done by utilizing the Doppler effect, which describes the relation between a frequency change and a relative motion between a beam transmitter and a beam receiver.

The output signals of blocks 107 (wyaw) and 109 (wgps) are supplied to block 110. In block 110, the difference wyaw−wgps is formed. This difference is forwarded to block 111, where it is assigned the value db/dt.

Following block 111, variable db is integrated over time (i.e., added) in block 112 and float angle b is thus available in block 112.

Figure 2:
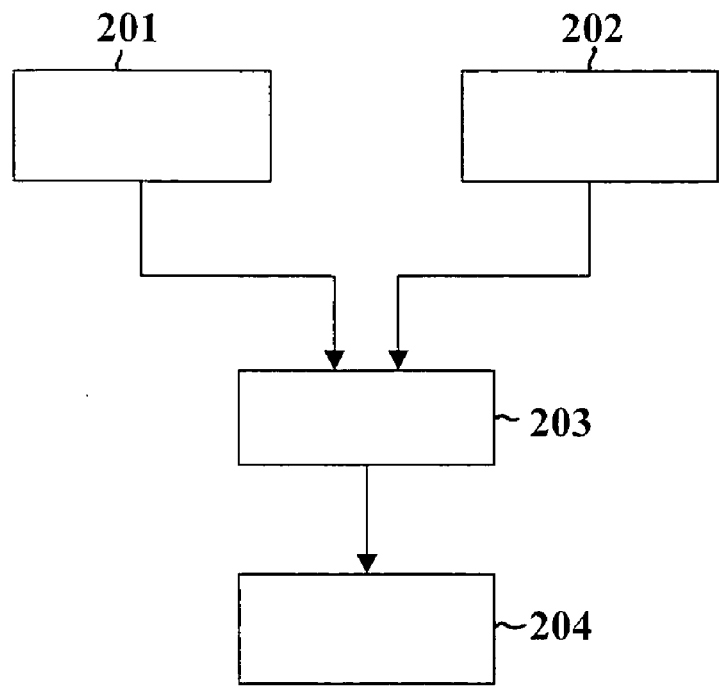
FIG. 2 shows the sequence of operations of the device for determining the float angle.

The configuration of the device for determining the float angle is shown in FIG. 2.

Block 201 denotes a yaw rate sensor that determines yaw rate wyawmeasured or wyaw.

Further, block 202 denotes a GPS system for receiving the velocity of the motor vehicle by absolute value and direction. The output signals of these two blocks are supplied to detection device 203. The float angle is determined in block 203. The float angle is forwarded to block 204. Block 204 is, for example
- a vehicle dynamics control system, which then in turn activates brake actuators, for example, or
- a restraint system in which, for example, the deployment thresholds of reversible belt tighteners are reduced or
- a predictive vehicle dynamics control system (e.g., ACC (active cruise control).

What is claimed is:

1. A method for determining a float angle of a motor vehicle, comprising:
   determining a yaw rate of the motor vehicle by a yaw rate sensor;
   determining a direction of a velocity in the center of gravity of the motor vehicle by performing a frequency analysis of a signal received by a GPS receiver located in the motor vehicle; and
   determining the float angle as a function of at least the yaw rate and the direction of the velocity of the motor vehicle.

2. A method for determining a float angle of a motor vehicle, comprising:
   determining a yaw rate of the motor vehicle by a yaw rate sensor;
   determining a direction of a velocity in the center of gravity of the motor vehicle by performing a frequency analysis of a signal received by a GPS receiver located in the motor vehicle;
   determining the float angle as a function of at least the yaw rate and the direction of the velocity of the motor vehicle;
   determining an angular speed from the direction of the velocity; and
   performing the determining of the float angle on the basis of the angular speed.

3. The method as recited in claim 2, wherein:
   the angular speed corresponds to a rotational speed of a vector that corresponds to the velocity.

4. The method as recited in claim 3, further comprising:
   determining a difference between the yaw rate and the angular speed; and
   performing the determining of the float angle on the basis of the difference by integration over time.

5. A method for determining a float angle of a motor vehicle, comprising:
   determining a yaw rate of the motor vehicle by a yaw rate sensor;
   determining a direction of a velocity in the center of gravity of the motor vehicle by performing a frequency analysis of a signal received by a GPS receiver located in the motor vehicle; and
   determining the float angle as a function of at least the yaw rate and the direction of the velocity of the motor vehicle, wherein:
   the determining of the direction of the velocity is performed based on the Doppler effect.

6. A device for determining the float angle of a motor vehicle, comprising:
   a yaw rate sensor for determining a yaw rate of the motor vehicle;
   a GPS receiver located in the motor vehicle and for determining a direction of a velocity in the center of gravity of the motor vehicle by analyzing a frequency of a received signal; and
   a detection arrangement for determining the float angle on the basis of at least the yaw rate and the direction of the velocity of the motor vehicle.

7. A device for determining the float angle of a motor vehicle, comprising:
   a yaw rate sensor for determining a yaw rate of the motor vehicle;
   a GPS receiver located in the motor vehicle and for determining a direction of a velocity in the center of gravity of the motor vehicle by analyzing a frequency of a received signal; and
   a detection arrangement for determining the float angle on the basis of at least the yaw rate and the direction of the velocity of the motor vehicle, wherein:
   an angular speed is determined in the detection arrangement from the velocity; and
   the float angle is determined on the basis of the angular speed.

8. The device as recited in claim 7, wherein:
   the angular speed corresponds to a rotational speed of a vector that corresponds to the velocity.

9. The device as recited in claim 8, wherein:
   the detection arrangement determines a difference between the yaw rate and the angular speed; and
   the detection arrangement determines the float angle on the basis of the difference by integration over time.

* * * * *

UNITED STATES PATENT AND TRADEMARK OFFICE
CERTIFICATE OF CORRECTION

PATENT NO.        : 7,058,486 B2                                        Page 1 of 1
APPLICATION NO.   : 10/681022
DATED             : June 6, 2006
INVENTOR(S)       : Dietmar Arndt It is certified that error appears in the above-identified patent and that said Letters Patent is hereby corrected as shown below:

Column 3, line 10, change "velocity vector "(vx, vx, vz)" to --(vx, vy, vz)--

Signed and Sealed this

Seventh Day of August, 2007

JON W. DUDAS
*Director of the United States Patent and Trademark Office*